April 8, 1958   P. E. FEDDER   2,829,823
ANALOGUE METHOD FOR DETERMINATION OF MODULI OF A PLANAR REGION
Filed Dec. 20, 1951   2 Sheets-Sheet 1
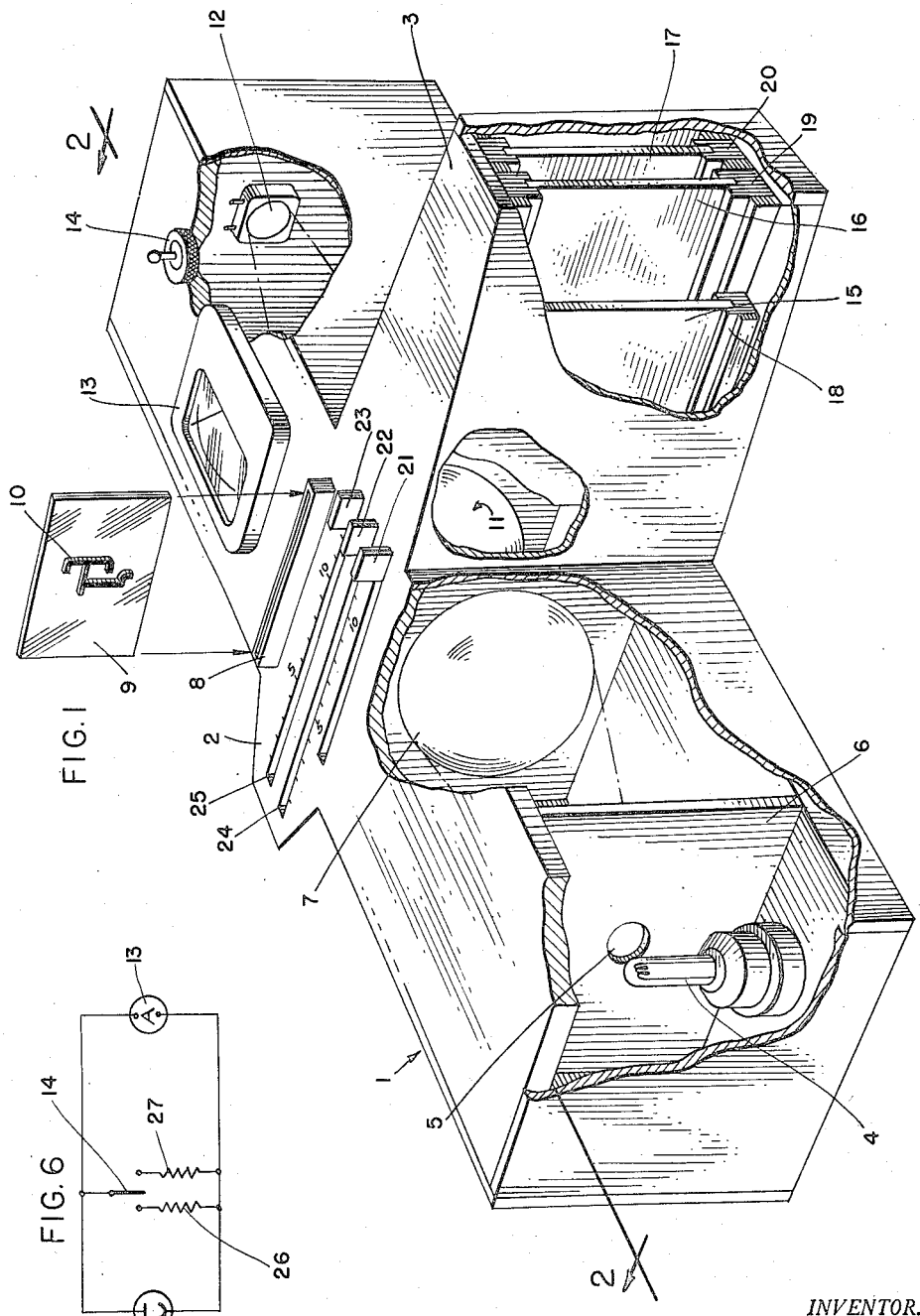
INVENTOR:
PAUL E. FEDDER
BY
ATT'YS April 8, 1958  P. E. FEDDER  2,829,823
ANALOGUE METHOD FOR DETERMINATION OF MODULI OF A PLANAR REGION
Filed Dec. 20, 1951  2 Sheets-Sheet 2
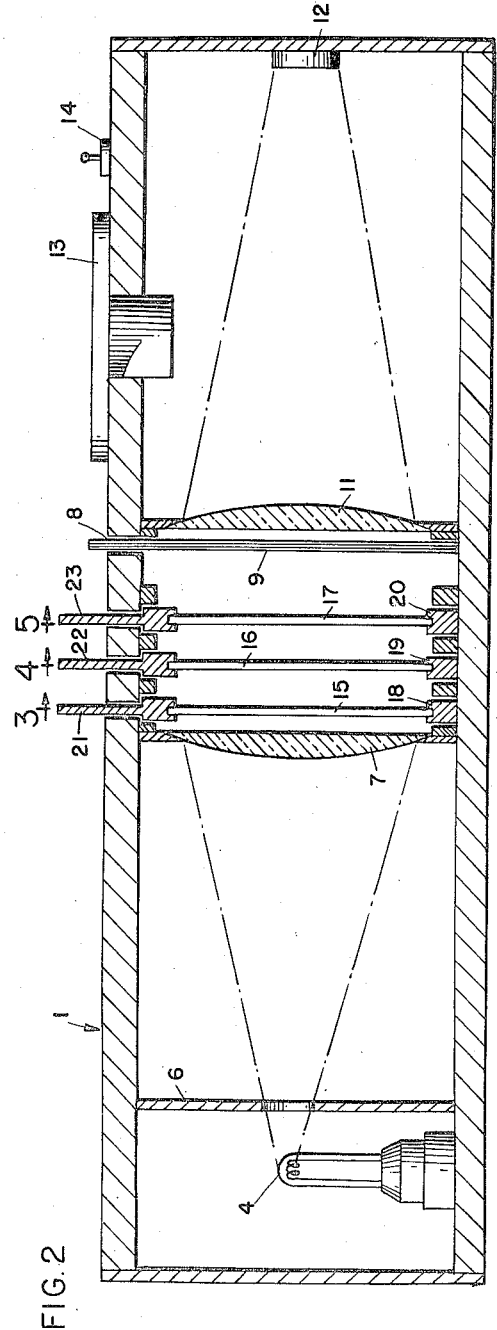
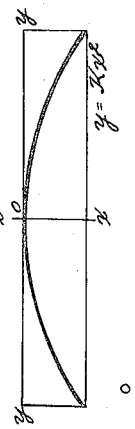
INVENTOR:
PAUL E. FEDDER
BY
ATT'YS

United States Patent Office 2,829,823
Patented Apr. 8, 1958

2,829,823

ANALOGUE METHOD FOR DETERMINATION OF MODULI OF A PLANAR REGION

Paul E. Fedder, Hammond, Ind.

Application December 20, 1951, Serial No. 262,589

5 Claims. (Cl. 235—61)

This invention relates to an analogue method for the determination of geometrical and mechanical moduli of a defined planar region. The method involves physical operations corresponding to mathematical operations for evaluating double integrals over the region.

It is known to employ mechanical calculators for working out the integrals of complex mathematical problems and similar results have been obtained through the use of complex electronic apparatus. Likewise it is known to compute the integral functions of complex mathematical problems by lengthy computations performed by one who is highly skilled in the necessary branches of mathematics and mechanics. The latter procedure is subject to frequent and often costly error while the mechanical and electronic calculations require extremely complex and expensive apparatus, and usually the services of a skilled operator.

Therefore it is an object of the present invention to provide a simplified method for calculating integral functions by electro-optical means.

Another object of the invention is to provide a method for determining the dimensions and properties of irregularly shaped articles in a simplified and inexpensive manner.

Still another object of the invention is to provide a method for employing electro-optical apparatus to determine the dimensions and properties of difficultly measurable articles.

These and other objects and advantages of the invention will become more apparent upon a consideration of the following description, taken in conjunction with the accompanying drawings in which:

Figure 1 is a perspective view of one embodiment of the apparatus employed according to this invention with parts broken away to show internal structure and components;

Figure 2 is a sectional view taken along the lines 2—2 of Figure 1;

Figure 3 is a view of a multiplier screen or filter taken along the lines 3—3 of Figure 2 in the direction of the arrows, shaded according to the mathematical formula shown in Figure 3a;

Figure 4 is an elevational view of a multiplier screen or filter, taken along the lines 4—4 of Figure 2 in the direction of the arrows and shaded according to the mathematical formula shown in Figure 4a;

Figure 5 is an elevational view of a multiplier screen or filter taken along the lines 5—5 of Figure 2 in the direction of the arrows and shaded according to the mathematical formula shown in Figure 5a; and Figure 6 is a wiring diagram of the electrical circuit in the apparatus illustrated in Figures 1 and 2.

The invention provides an analogue method for the determination of geometrical and mechanical moduli of a defined planar region, involving the determination of an extremal value of a function which is defined by the double integral of an integrand of a plurality of variables over the region, which comprises providing an object screen having a representation of the region thereon, the representation and the remainder of the screen each being of uniform transparency, the transparency of the representation being different from that of the remainder of the screen, providing multiplier screen means for transmitting uniform incident light as light of intensity which varies from point to point in accordance with the said integrand, interposing the object screen and the multiplier screen means in multiplying relationship in the path of light from a uniform light source, and moving the object screen and the multiplier screen means relative to each other in their respective planes until the total amount of light transmitted thereby reaches an extremal value, whereby the extremal value of the function and thus also moduli of the region may be ascertained. An apparatus is employed for determining integrals by interrupting and absorbing a portion of a beam of light as it passes through an opening, and receiving the remainder of the beam of light on a photoelectric cell to thereby energize the cell and to provide an electrical impulse which can be measured and read on a suitable electrical measuring means. Also employed are suitable light diverging and converging means for distributing the beam of light in a suitable manner and shaded filter means for absorbing the light prior to its transmission or absorption through an object screen or work-piece to the photoelectric cell. The invention also contemplates the use of suitable filters or multiplier screens which are calculated to transmit or interrupt the passage of light and which are suitably shaded in accordance with definite functions as expressed in mathematical formulae.

The invention will be described in detail as it is adapted for use in solving a wide variety of mathematical problems which ordinarily arise in engineering practice. It is not intended that the invention be so limited, however, because the method may be employed and the apparatus may be adjusted to give the result of any integral mathematical formula, regardless of how it was derived. For example, the apparatus will be illustrated in a particular form which can yield the following values:

(1) The area of an irregularly shaped cross section.
(2) The first moment of area (statical moment) of a cross section.
(3) The moment of inertia of a cross section.
(4) The section modulus.
(5) The centroidal axis of a cross section.
(6) The center of liquid pressure of a cross section.
(7) The moment of inertia about a neutral axis.

Considering the drawings in detail, Figure 1 illustrates one embodiment of an apparatus constructed for use in the method according to the invention and comprising an elongated cabinet 1. The cabinet 1 is essentially rectangular in shape but is provided near its center with projections 2 and 3 located transversely thereof to house slidable filters which will be described in detail hereinafter. A suitable source of light, such as the lamp 4 is located near one end of the box and is adapted to project a beam of light through a suitable opening 5 in a partition 6 in the cabinet. The beam of light strikes a lens 7 which collimates the light and transmits the light into the filter area and work receiving area of the cabinet. An opening 8 is provided in the top of the cabinet 1 of a suitable size and shape to receive an object screen or work-piece 9 upon which a cross sectional drawing 10 of an irregularly shaped figure is located, the properties of which figure are to be determined by the apparatus. A converging lens 11 is located on the side of the work-piece 9 opposite that of the light source 4 and adapted to collect and converge the light which is transmitted through the work-piece 9, The converging beam of light transmitted by the lens 11 strikes a photoelectric cell 12 which is energized thereby and gives off an electrical current which can be read on the meter 13 which may be either an ammeter or volt meter depending on the way the electrical apparatus is connected. In the present embodiment the meter 13 is a micro-ammeter which may or may not be calibrated to read directly in terms of the mathematical results derived by the apparatus. A switch 14 is provided in the electrical circuit and the function of the switch will be described more fully hereinafter.

A plurality of multiplier screens or filters 15, 16 and 17 are mounted in suitable frames 18, 19 and 20, respectively, so that they may be reciprocated transversely of the cabinet 1 to intersect the beam of light which passes between the lens 7 and the work-piece 9. The reciprocation of the filters is facilitated by the handles 21, 22 and 23 and suitable scales are marked on the top of the cabinet 1 alongside the slots 24 and 25 through which the handles 22 and 23 may reciprocate. The purpose of these filters and scales will be apparent in the following description.

In the operation of the apparatus to determine an integral function of an irregularly shaped object 10 on the work-piece 9 a suitable cross sectional drawing of the irregular shape is made on a light transmitting medium, such as glass, cellophane or translucent draftsman's paper. The work-piece thus prepared is inserted into the cabinet 1 through the opening 8 and is positioned so that it will intersect the beam of light passing between the lenses 7 and 11. The full amount of light generated by the lamp 4 and passing through the lens 7 will pass through the transparent work-piece 9 and be recorded on the photoelectric cell 12, minus the amount of light which is interrupted and absorbed by the darkened cross sectional drawing 10. By a suitable calibration of the meter 13 it is possible to read the cross sectional area of the piece shown in the cross sectional drawing 10 directly. If desired, the filter 15 may be advanced until it intersects the beam of light between the lens 7 and the work-piece 9 thereby absorbing the light and dimming the amount of transmitted light in order to protect the photoelectric cell. It will be understood that the use of the filter 15 is optional depending upon the nature of the work-piece 9 and whether or not it is determined that an excessive amount of light is passing through the apparatus to the photoelectric cell.

If it is desired to find the centroidal axis and the first moment of area (statical moment) of a cross section, the work-piece 9 bearing the figure 10 of unknown properties is inserted between the lenses 7 and 11 and the light source 4 is energized. A certain reading will be observed on the ammeter and the filter 16 will be advanced into the path of the light, slowly, until the reading on the ammeter reaches its minimum point. This figure, assuming that the ammeter has been calibrated to read statical moments, will be a direct reading of the statical moment or the first moment of area of the cross sectional piece. The position of the lever 22 on the filter 16 can be read from the scale alongside the slot 24 and this position will indicate the location of the centroidal axis of the cross section. This is assuming, of course, that the apparatus has been suitably calibrated so that the lever position can be read directly in terms of the centroidal axis location. Ordinarily the apparatus is adjusted to give a direct reading in inches from the bottom of the figure.

It is possible to find the moment of inertia about the centroidal axis of the cross section simply by inserting the work piece 9 bearing the cross section 10 between the two lenses 7 and 11 as indicated in Figures 1 and 2 of the drawings. A certain reading will be observed on the ammeter and the multiplier screen or filter 17 will be advanced into the path of the beam of light progressively until the ammeter reading is at its lowest point. Assuming that the meter has been suitably calibrated to show moments of inertia, the reading on the scale alongside the slot 25 as determined by the position of the handle 23 on the filter 17, will be a direct reading of the centroidal axis.

The device can be used to determine the section modulus for both the top and bottom sections of the cross sectional piece by advancing the filter 17 as indicated in the foregoing paragraph in finding the moment of inertia, until the ammeter reading is at its lowest point. Then the switch 14 is actuated to bring in a resistance 26 (see Figure 6) which is attached in parallel with the photoelectric cell 12 and the ammeter 13 so that a predetermined amount of current is shunted through the resistance. The ammeter reading with the switch in its forwardly actuated position will give the section modulus for one-half of the section. The switch may then be actuated to its retracted position to cut in the resistance 27 (Figure 6) of a predetermined value and the ammeter can then be read in terms of the section modulus of the other half of the section.

The new method has been described above in connection with the operation of the particular apparatus illustrated. The following is a discussion of the fundamental principles involved, and the mathematical proof. Particular reference is made to the above description of the manner of determining the moment of inertia about the centroidal axis of a region, and the location of the centroidal axis. In the following discussion, however, for easy visualization, the object representation 10 will be assumed to be transparent and the remainder of work piece 9 opaque, with the multiplier screen 17 shaded accordingly.

If a point mass $m$ be situated at a distance $r$ from a fixed line, the product $mr^2$ is called the moment of inertia of $m$ about this line as axis: $I=mr^2$. It is also found in calculus that the moment of inertia of a plane lamina A, having constant thickness and having constant density $\rho$, about the Y-axis, is determined by the formula $$I=\rho\iint_A x^2 dx dy$$

This is the double integral of $g(x,y)=\rho x^2$ over the region A.

For many regions A, the mathematical integration is very difficult. The invention provides an accurate method of performing the double integration, employing a physical situation which matches the mathematical one whose solution is desired.

First, a multiplier screen (17) is shaded, the shading or, conversely, the transparency varying from point to point according to the equation $T=g(x,y)=\rho x^2$. Next, an object screen (9) is prepared with the object representation (10) of the region A on it.

By superimposing the multiplier screen on the object representation and passing light through the two, it will at once be apparent that a double integration is performed of the function $g(x,y)=\rho x^2$ over the transparent region A. The result is in terms of light transmitted by the combination of screens, which is converted to the corresponding numerical value for the moment of inertia.

At this point, it will be noted that if the light incident on the multiplier screen has intensity Z, the effect of interposing this screen of variable transparency is to multiply Z by a variable factor $T=g(x,y)$, according to the equation by which the transparency of the screen is determined, so that the transmitted light will have intensity ZT. Thus, the shaded screen 17 is termed a "multiplier screen."

Up to now, the explanation has concerned the moment of inertia about the Y-axis, which corresponds to the central vertical axis of the multiplier screen superimposed on an arbitrary vertical Y-axis of the object screen. The latter may be, for example, the central vertical axis of the object screen.

If now the multiplier screen be displaced to the right, while still covering the object screen, so that its central axis is $s$ units to the right of that of the object screen, the above double integral becomes $$F(s) = \rho \iint_A (x-s)^2 dx dy$$

and the numerical value is the new moment of inertia about a new vertical axis on the object screen which is displaced $s$ units from the central or arbitrary Y-axis.

Physically, the effect of changing the relative positions of the screens is to superimpose a different portion of the multiplier screen on the transparent object. Since the shading of the multiplier screen varies from point to point, it will let more or less light pass through the object. How much light is let through depends on the configuration of the object. Whether movement of one screen to the right or left will increase or decrease the amount of light passing through depends on the configuration of the object.

In the particular problem being considered, it is desired to find the moment of inertia about the centroidal axis. But the location of the centroid is unknown (for example, see object 10, whose centroid obviously cannot be determined by inspection). Thus, whether the vertical centroidal axis coincides with the central vertical axis (arbitrary Y-axis) of the object screen 9, or is displaced to the right or left, is unknown, i. e., it is unknown what value $s$ must be given so that the multiplier screen central vertical axis may be made to coincide with the centroidal axis.

A characteristic of the present invention is the extreme simplicity and rapidity with which the centroidal axis can be located; at the same time, since the central axis of the multiplier screen coincides with the centroidal axis of the object, the light transmitted by the screens corresponds to the moment of inertia about the centroidal axis. This will now be explained and proven.

First observe that a condition given in the prior description of operation to find the moment of inertia is that the screens be moved relatively until the meter reading is lowest (minimal). Here it will be noted in the drawing (Fig. 1) that multiplier screen 17 is considerably larger than object screen 9, so that as screen 17 is moved back and forth, some part of screen 17 covers screen 9, to perform the integration. Since minimum light transmission is here determined, there is no need to make sure that screen 9 is always completely covered by some part of screen 17; if not, the light transmission would increase and could not give a false minimum. A minimum will be observed only when the object screen is completely covered by some part of the multiplier screen.

It will be further noted, referring back to the physical effect of moving the screens, that when one portion of the object is under one part of the multiplier screen with a certain degree of shading, other portions are under other parts of the multiplier screen having different degrees of shading, since it varies from point to point. What takes place in moving the screens to find the minimum light transmission is a balancing of the screens against each other, with generally the greatest darkening effect of the multiplier screen concentrated near the greatest concentration of transparency on the objcet, while yet keeping the light transmitted through the more remote areas of the object such that the sum through all of the areas is the minimum.

Alternatively, as assumed in this explanation, the object representation 10 can be transparent, which condition renders the corresponding result a maximum. Either the absorbed light is maximal and the transmitted light (read by the meter) is minimal, or vice versa. Thus, an "extremal" value, minimal or maximal, is determined.

Instead of $s$ being known in the above double integral $$\rho \iint_A (x-s)^2 dx dy$$

it is now unknown for the centroidal axis, but when found, the integral and thus the light meter reading which is the result of the double integration, will give the desired moment of inertia about the centroidal axis of object representation 10 of the region A.

When the above condition of minimum (or maximum) meter reading is satisfied, the value for the double integral is correspondingly a minimum (or maximum). From differential calculus, it is known that given a function $f(x)$ whose first derivative is $f'(x)$, if $x_1$ is a special value of $x$ such that $f'(x_1)=0$, $x_1$ is the abscissa of either a maximum point or a minimum point of the curve $y=f(x)$. Applying this knowledge to the above function, when $$F(s) = \rho \iint_A (x-s)^2 dx dy$$

is a minimum or maximum, then $$0 = F'(s) = \frac{d}{ds} \rho \iint_A (x-s)^2 dx dy$$

which computed is $$\rho \iint_A 2(x-s) dx dy = 0$$

or $$\iint_A x \, dx dy = s \iint_A dx dy$$

when solved for $s$ is $$s = \frac{\iint_A x \, dx dy}{\iint_A dx dy}$$

which is also the standard formula giving the location of the centroidal axis. The proof is thus complete.

Summarily, when the screens are moved relatively until the light transmitted is extremal (minimal or maximal according to the method chosen for constructing the screens), the central vertical axis of the multiplier screen coincides with the centroidal axis of the object, which is located the now measurable distance $s$ from the reference axis of the object. The displacement value $s$ can then be read directly by means of any indicator such as handle 23 suitably fixed to the multiplier screen, and a scale fixed relative to the object screen. The moment of inertia about the centroidal axis is read directly from the calibrated meter.

Reference was previously made to the determination of the moment of inertia about the neutral axis, which is a line perpendicular to the plane of the object screen 9 passing through the centroid of the object representation 10 of the region A. This determination requires the further operation of rotating the object screen 90°; then repeating the method. A second line or axis through the centroid of the region is thus found. The single point at which the two centroidal axes intersect is the exact location of the centroid of the region. The sum of the light meter readings for the two positions of the object screen is the moment of inertia of the region A represented by 10, about the neutral axis.

While the method has been described for calculating various unknowns with respect to engineering problems, it should be remembered that it is not limited to these applications. The method may be employed for determining various geometrical and mechanical moduli of various regions, determining the extremal values of various functions defined by double integrals of integrands of a plurality of variables. To this end, the object representation 10 may be varied as desired. Likewise a large number of physical properties of unknown figures can be determined simply by inserting additional filters of the type previously described and employing resistances, the shading of said filters and the value of said resistances being determined in advance according to definite mathematical formulae. For example, other filters may be prepared and supplied in place of the filters 15, 16 and 17 as illustrated in Figures 3, 4 and 5, respectively. The shading on these filters is determined in advance with reference to the mathematical formulae disclosed in Figures 3a, 4a and 5a, respectively. Given any particular mathematical formulae, a skilled mathematician can develop the necessary curve and can shade a filter in the same manner as illustrated herein. The filters may be prepared by manual shading on transparent sheet material or they may be prepared by exposing photographic film to develop shading according to selected mathematical formula. It will be appreciated, of course, that any desired number of filters may be positioned in the box, each shaded to absorb light and cooperate with the other parts in the solution of a problem.

As previously indicated, the work-piece may consist of a sheet of transparent material upon which is drawn a darkened cross sectional figure of irregular characteristics, the properties of which are to be determined. In this embodiment of the invention the light is allowed to pass through the majority of the work-piece with a certain portion of the light being absorbed or intercepted by the darkened cross sectional figure. It is contemplated that the invention may be practiced by cutting a suitably thin cross sectional piece from a structural object, the properties of which are to be determined, and supporting the piece between two sheets of transparent material or upon a single sheet.

In another embodiment of the invention it is contemplated that the work-piece 9 will be opaque, while the cross sectional Figure 10 will be transparent or translucent. In this embodiment, the amount of light transmitted through the cross sectional Figure 10 will be recorded on the photoelectric cell and the meter. The adjustment of the apparatus for this embodiment requires no more than ordinary skill in the regulation of the electrical circuits.

Other suitable electrical measuring apparatus may be employed in place of the photoelectric cell 12 and the ammeter 13. For example, under certain methods of connecting the electrical circuits, the meter 13 may be a volt meter and may be calculated to read directly in terms of the values sought in the same manner that an ammeter may be calibrated.

Referring to Figure 6 it will be apparent that the output of the photoelectric cell 12 will ordinarily be read directly on the meter 13. When desired, however, the operator may actuate the switch 14 to cut in either one of the resistances 26 and 27. Alternatively, one of the resistances, or both, may be replaced with a variable resistor, thereby providing even greater flexibility in the operation of the apparatus. When either of the resistors is cut in, a portion of the current will be drawn therethrough and the amount registered on the meter 13 will be reduced by an amount equal to the value of the resistance.

The calibrations referred to hereinabove are not necessarily required in order to make the apparatus operable. Where possible, however, it is best practice to calibrate the meter and the position of filters so that they will read final values directly and will require no conversion. Once this has been done a relatively, unskilled operator can derive extremely complex integral formulae merely by routine actuation of the components of this system.

From the foregoing disclosure of the invention it will be apparent that I have provided a new method for performing extremely complex mathematic integrations almost instantaneously and without error.

The invention is hereby claimed as follows:

1. An analogue method for the determination of geometrical and mechanical moduli of a defined planar region, involving the determination of an extremal value of a function which is defined by the double integral of an integrand of a plurality of variables over the region, which comprises providing an object screen having a representation of said region thereon, the representation and the remainder of the screen each being of uniform transparency, the transparency of the representation being different from that of the remainder of the screen, providing multiplier screen means for transmitting uniform incident light as light of intensity which varies from point to point in accordance with the said integrand, interposing said object screen and said multiplier screen means in multiplying relationship in the path of light from a uniform light source, and moving said object screen and said multiplier screen means relative to each other in their respective planes until the total amount of light transmitted thereby reaches an extremal value, whereby said extremal value of said function and thus also moduli of said region may be ascertained.

2. An analogue method for the determination of geometrical and mechanical moduli of a defined planar region, involving the determination of an extremal value of a function which is defined by the double integral of an integrand of a plurality of variables over the region, which comprises providing an object screen having a representation of said region thereon, the representation and the remainder of the screen each being of uniform transparency, the transparency of the representation being different from that of the remainder of the screen, providing a multiplier screen having a transparency which varies from point to point in accordance with the said integrand, interposing said screens in multiplying relationship in the path of light from a uniform light source, moving said screens relative to each other in their respective planes until the total amount of light transmitted thereby reaches an extremal value, and measuring the total amount of light transmitted by said screens at their positions providing said extremal value, to thereby provide a light measurement which is proportional to said extremal value of said function.

3. An analogue method for the determination of geometrical and mechanical moduli of a defined planar region, involving the determination of an extremal value of a function which is defined by the double integral of an integrand of a plurality of variables over the region, which comprises providing an object screen having a representation of said region thereon, the representation and the remainder of the screen each being of uniform transparency, the transparency of the representation being different from that of the remainder of the screen, providing a multiplier screen having a transparency which varies from point to point in accordance with the said integrand, interposing said screens in multiplying relationship in the path of light from a uniform light source, moving said screens relative to each other in their respective planes until the total amount of light transmitted thereby reaches an extremal value, and measuring the relative displacement of said screens at their positions providing said extremal value, to thereby provide the location of the ordinate corresponding to said extremal value of said function.

4. An analogue method for the determination of geometrical and mechanical moduli of a defined planar region, involving the determination of an extremal value of a function which is defined by the double integral of an integrand of a plurality of variables over the region, which comprises providing an object screen having a representation of said region thereon, the representation and the remainder of the screen each being of uniform transparency, the transparency of the representation being different from that of the remainder of the screen, providing a multiplier screen having a transparency which varies from point to point in accordance with the said integrand, interposing said screens in multiplying relationship in the path of light from a uniform light source, moving said screens relative to each other in their respective planes until the total amount of light transmitted thereby reaches an extremal value, measuring the total amount of light transmitted by said screens at their positions providing said extremal value, and measuring the relative displacement of said screens at said positions of extremal value to thereby provide a light measurement which is proportional to said extremal value of said function and the location of the ordinate corresponding to said extremal value of said function.

5. An analogue method for the determination of geometrical and mechanical moduli of a defined planar region, involving the determination of an extremal value of a function which is defined by the double integral of an integrand of a plurality of variables over the region, which comprises providing an object screen having a representation of said region thereon, the representation and the remainder of the screen each being of uniform transparency, the transparency of the representation being different from that of the remainder of the screen, providing a multiplier screen having a transparency which varies from point to point in accordance with the said integrand, interposing said screens in multiplying relationship in the path of light between a uniform light source and a light-responsive device, moving said multiplier screen in its plane until the total amount of light transmitted by the screens reaches an extremal value, and measuring the total amount of light transmitted by said screens at the position of said multiplier screen providing said extremal value, to thereby provide a light measurement which is proportional to said extremal value of said function.

References Cited in the file of this patent

UNITED STATES PATENTS

| | | |
|---|---|---|
| 2,043,589 | Muller | June 9, 1936 |
| 2,088,297 | Koenig | July 27, 1937 |
| 2,098,326 | Wente | Nov. 9, 1937 |
| 2,179,000 | Tea | Nov. 7, 1939 |
| 2,410,550 | Padva | Nov. 5, 1946 |
| 2,528,020 | Sunstein | Oct. 31, 1950 |
| 2,557,691 | Rieber | June 19, 1951 |
| 2,631,491 | Ragan et al. | Mar. 17, 1953 |

OTHER REFERENCES

Schiff: Abstract of Serial No. 664,889 published in 635 O. G. 971 on June 20, 1950.

Huggins, M. L.: "Photographic Fourier Syntheses," pages 66–69, Journal of the American Chemical Society, vol. 63, January 1944. (Copy in U. S. Patent Office Library.)